Figure 1:
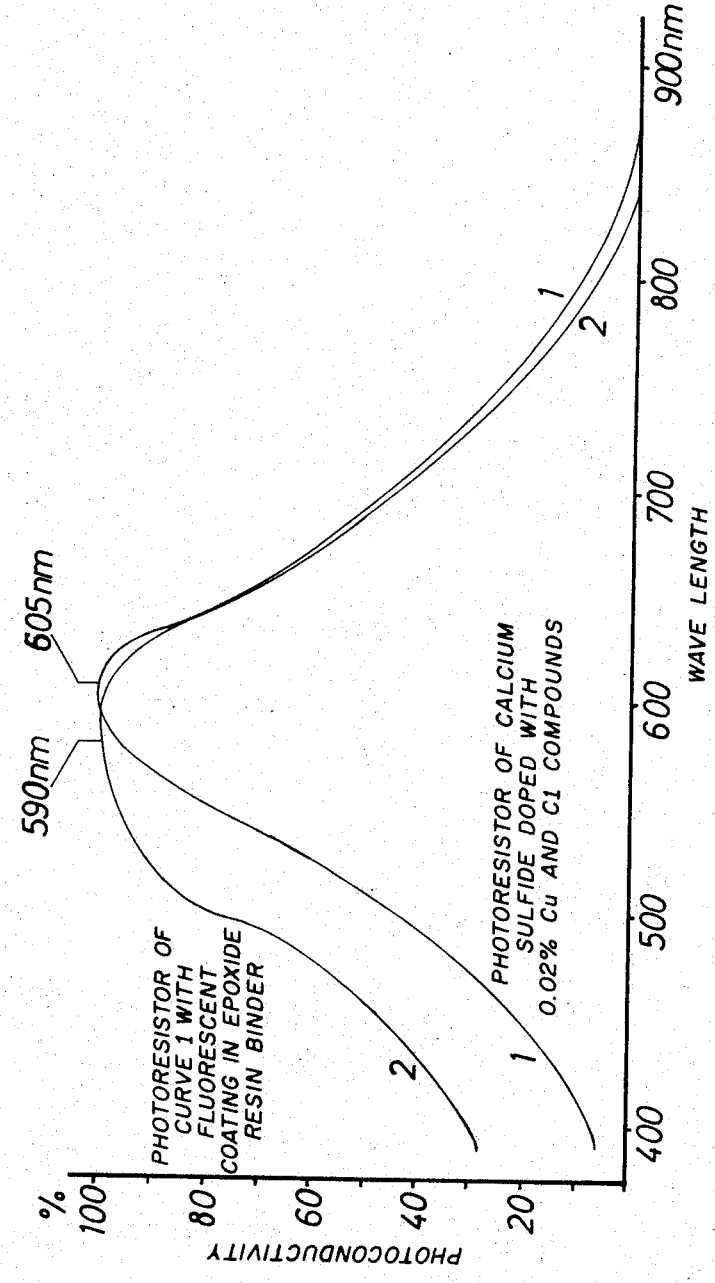

United States Patent Office 3,351,516
Patented Nov. 7, 1967

3,351,516
PHOTOCONDUCTIVE STRUCTURAL ELEMENT
AND PROCESS OF MANUFACTURING SAME
Roland Weisbeck, Cologne-Poll, Andreas Brockes, Cologne-Mulheim, and Heinrich Nassenstein, Cologne-Stammheim, Germany, assignors to Farbenfabriken Bayer Aktiengesellschaft, Leverkusen, Germany, a German corporation
Filed Oct. 7, 1963, Ser. No. 314,129
Claims priority, application Germany, Oct. 13, 1962, F 38,032; Nov. 6, 1962, F 38,227
13 Claims. (Cl. 161—184)

This invention relates to a process for the manufacture of photoconductive structural elements from material which contains cadmium sulphide and/or -selenide and which has been doped with copper compounds and chlorine compounds, this material being moulded into bodies of the desired shape and then subjected to a heat treatment and optionally coated with a layer widening the spectral sensitivity of the material towards the short-waved spectral region.

It is known to manufacture photoconductive structural elements from cadmium sulphide, -selenide, -sulpho-selenide and -telluride and from cadmium sulphide to which cadmium oxide has been added. In this process, the photosemiconductors are used in the form of monocrystals, polycrystals, layers of binding agent, high vacuum)-evaporation layers or sintered layers on a carrier or in the form of sintered moulded bodies. The method of producing reproducibly monocrystals or polycrystals with clearly defined good photoconductive properties is difficult to carry out and therefore expensive and uneconomical. In the case of layers of binding agent, the photosemiconductor is embedded homogeneously in the form of a power in a binding agent. These layers are simple to produce but their photoelectrical properties are unsuitable for many purposes because the layers have a very high ohmic resistance and do not obey Ohm's law. The photocurrent is proportional to a power of the voltage, the exponent being greater than 1 and usually between 3 and 4. Furthermore, such layers are very slow to respond. Particularly interesting from a technical point of view are the high vacuum evaporation layers, the sintered layers and the sintered moulded bodies.

One disadvantage of the evaporation process is that the evaporation layers obtained by evaporating cadmium sulphide in a high vacuum always contain an excess of cadmium. These layers, which are more or less seriously affected stoichiometrically, must be subjected to a subsequent heat treatment. The photoelectrical properties resulting from this heat treatment often differ considerably from one layer to another when a large number of evaporation layers is produced.

In the production of sintered layers of cadmium sulphide and/or -selenide with copper- and chlorine compounds as activators on a carrier, it is usual to add about 10% cadmium chloride, calculated on the cadmium sulphide and cadmium sulphide and/or -selenide respectively, as solvent for cadmium sulphide and/or -selenide. It is assumed that the cadmium chloride evaporates at the sintering temperature. Although the large amount of cadmium chloride which is added results in the advantage that the sintered layer adheres very firmly on the carrier, it causes a considerable lag when the photo-current decreases in the dark after the source of illumniation has been switched off in cases where sintered layers are used as photoresistors.

Moulded sintered bodies of cadmium sulphide with copper and gallium as activators have a relatively high time lag as regards their capacity to respond when the source of light is switched on or off, particularly at low intensities of illumination. This lag may be reduced and the sensitivity increased by the addition of cadmium oxide, but these sintered moulded bodies have the characteristic, which is a disadvantage for some applications of a photoresistor, that the photocurrent does not increase linearly with the voltage applied, which would be in accordance with Ohm's law, but increases with a power of the voltage, the exponential value being generally in the region of 1.2. These photoresistors have a relatively high ohm value at low voltages.

It is known that both in photoresistors and in barrier layer cells which are all based on the action of the internal photoelectric effect, the spectral sensitivity distribution is determined by the absorption properties of the semiconductor material used.

The spectral distribution of photoconductivity and photo voltage are substantially analogous to the absorption spectrum. In pure substances without lattice disturbance, the photoconductivity and the photo voltage have a marked maxium near the absorption edge of the base lattice; the optical energy of activation coincides with the absorption edge. Towards the short waves, there is a drop in sensitivity due to the fact that the short waves are strongly absorbed in layers near the surface where recombination of the pairs of charge carriers is particularly marked. Depending on the strength of the recombination at the surface the drop is more or less steep towards the shorter waves; in the photosemiconductors which are of most interest technically, the drop is steep. The drop towards the long wave end of the scale is due to the reduction in absorption, in other words the reduction in activation. In pure substances without lattice disturbance there should be no end tail absorption since the absorption edge of the base lattice already corresponds to the maximum wavelength of the incident radiation at which the photo energy is still just sufficient to overcome the prohibited zone in the band model. However, in reality every lattice is more or less disturbed.

By the addition of foreign substances or, in the case of compound semiconductors, by deviations from stoichiometric proportions or for example by mechanical lattice deformations such as may occur by grinding, the sensitivity of the photo conductivity and of the photo voltage is displaced towards the longer wavelengths. Depending on the intensity and type of lattice disturbance, the long wave tail ends are flattened and extended in length, the maximum being seen at the absorption edge of the base lattice, or alternatively new subsidiary maxima may occur in the tail end in addition to this main maximum, or alternatively a subsidiary maximum in the tail end becomes so great that the absorption edge of the base lattice can no longer be recognised and the absolute sensitivity maximum lies at a point of greater wavelength; for example, the sensitivity of zinc oxide to blue when there is an excess of zinc, although zinc oxide is otherwise only sensitive in the ultraviolet range, and the displacement of the maximum photosensitivity of germanium from $1\mu$ to $9\mu$ by doping with gold (at 78° K.) and to $40\mu$ after doping with zinc (at 4° K.).

Another method of displacing the sensitivity to longer wavelengths is sensitising with a suitable organic dyestuff, for example from the group of cyanine dyestuffs. The dyestuffs must be adsorbed, and light energy taken up must be given off to the semiconductor in such a way that free charge carriers are produced in the semiconductor.

However, in many cases it is of interest to extend the region of spectral sensitivity of a given semiconductor material towards shorter wavelengths. In many cases, the sensitivity in the remaining spectral region should remain substantially unchanged.

It is known that in indium antimonide, the absorption edge may be displaced towards shorter wavelengths by the addition of donors. For example, by doping with nickel, the absorption edge of $\lambda=7\mu$ can be displaced to $\lambda=3.2\mu$. A similar phenomenon was observed in the case of indium arsenide with displacement of the absorption edge by $0.7\mu$. These extraordinary effects may be interpreted on the basis of the special band structure of these substances.

The present invention concerns the manufacture of photoconductive structural elements from material containing cadmium sulphide and/or -selenide. The process is characterised in that highly purified hexagonal cadmium sulphide and/or -selenide together with 0.5 to 10%, preferably 2 to 5% of zinc sulphide, 0.5 to 2% cadmium chloride and 0.01 to 0.04% copper in the form of a copper salt are mixed to a uniform mixture either after tempering or even without tempering which mixture is then pressed into the required form without any external heat being supplied. These molded bodies are then heat treated between two smooth surfaces of a heat resistant and chemically inert material, with circulation of air.

For widening the spectral sensitivity the surface of the photoconductive structural elements, facing the light, are brought into optical contact with a suitable fluorescent substance.

This fluorescent substance absorbs the incident light only at the short wave-end of the spectral sensitivity curve of the semiconductor material used and emits this light as fluorescent light in the wavelength region of maximum sensitivity of this material. The sensitivity in the remaining spectral region is practically not affected by the fluorescent substance.

According to one preferred method of manufacturing the photoconductive structural elements, hexagonal cadmium sulphide and/or -selenide in the form of a fine crystalline powder is mixed with 0.5 to 10%, preferably 2 to 5%, calculated on the cadmium sulphide and/or -selenide, of fine, pure zinc sulphide.

Cadmium chloride and copper, the latter usually in the form of copper(II)chloride or copper sulphate, are dissolved in pure water and added to the mixture of cadmium sulphide and/or -selenide and zinc sulphide. The whole mixture is carefully homogenised in the aqueous phase and the water is driven off by heating to temperatures below 100° C. The quantity of dissolved cadmium chloride added is 0.5 to 2% calculated on the cadmium sulphide and/or -selenide, whereas the quantity of dissolved copper is between 0.01 and 0.04%. The dewatered homogeneous mixture is then carefully dried in a vacuum drying cupboard at temperatures below 100° C.

Moulded articles are then produced from the dry mixture in a press according to a predetermined pressure/time schedule, without further heating. Circular disks can easily be produced by this process and they are very suitable for many purposes. The pressures required are in the region of several tons per cm.$^2$, preferably in the region of 7 tons per cm.$^2$ because the density of the moulded article rises at pressures up to about 7 tons per cm.$^2$ but does not increase thereafter. The pressure/time schedule followed during the moulding process is also important to ensure good photoelectrical properties in the finished structural element. The pressure should be raised more or less uniformly from zero to the maximum pressure, for example within 1 to 10 seconds and should then be kept there for a certain time, e.g. 10 to 20 seconds, and then quickly reduced to zero. In this method, the packing of the material in the moulded article is such that about 93% of the available space is filled.

In accordance with a modification of the new process the dried homogenised mixture is tempered in the atmosphere prior to the moulding process. The pulverulent material is tempered in the air in a vessel which is not quite closed and which consists of a material being stable to high temperatures and not atacking the pulverulent material, for about 10 to 20 minutes at temperatures between about 620 and 580° C., and subsequently allowed to cool in the air. The pulverulent material is subjected to another dry mixing process and then moulded. This modified process is of advantage if mouldings of higher thickness (about >1 mm.) are to be produced, since otherwise divisions from the homogeneity of the doping may occur after the tempering of the tablets. The photoelectrical properties are influenced by such inhomogeneities.

When they have been moulded, the articles are subjected to a heat treatment. They are kept for about 10 minutes between two smooth surfaces of a heat resistant and chemically inert material in the presence of air in an oven which is heated from all sides and in which air circulates, the temperature being between 580 and 610° C. For example, the moulded articles may be placed between two smooth flat plates of quartz of pure aluminum oxide and this sandwich arrangement is then placed in an oven heated to about 500° C., the moulded disks being heated to the maximum temperature in the oven in about 8 to 15 minutes. At the end of the heat treatment, the oven is opened and the moulded articles are left to cool in the oven to about 400° C. before they are placed in a chamber of practically zero relative humidity.

The photoconductive structural elements prepared according to the present invention contain about 0.5–10% zinc-sulphide, 0.01–0.04% copper ions and 0.005–0.04% chlorine ions as guest components in the hexagonal host lattice.

The heat treated articles are then coated with electrodes by high vacuum evaporation. It is preferable to evaporate comb-electrodes to produce the photoresistors.

In the process according to the invention, a molecular sieve in a quantity up to 3% may be added and mixed with the starting material. The moulded articles are produced as described above.

The completed photoconductive structural elements must be well protected against moisture. They are therefore installed in glass flasks or in metal vessels with glass windows, these vessels being generally filled with dry inert gas and closed in an airtight fashion. Alternatively, these structural elements may be embedded in special cast resins.

In accordance with the invention the photoconductive layers can be brought into optical contact with the fluorescent substance prior to being embedded in order to extend the spectral sensitivity in the short-wave spectral region.

The answer to the problem as to how the optical contact between the fluorescent substance and the photosemiconductor-surface can best be established depends on the choice of fluorescent substance and on the properties of the semiconductor surface. If the fluorescent substance can easily be evaporated, e.g. in vacuo, without its properties being impaired, it can be applied to the semiconductor surface directly by evaporation, good optical contact being thus obtained. This method is suitable only when the semiconductor surface and the fluorescent substance do not influence each other adversely. The fluorescent substance may also be precipitated from a solution on the semiconductor surface. Furthermore, it may be applied by melting, suspension, or spraying. Again when these methods are used neither the properties of the semiconductor surface nor those of the fluorescent substance should be impaired. Another possibility in accordance with the process of the invention is that the fluorescent substance may be homogeneously distributed in small concentration, e.g. 0.01 to 1%, in a transparent inorganic or organic binding agent, this mixture being then applied in the form of a layer to the surface of the semiconductor. In this case, the optical contact between the particles of fluorescent substance and the semiconductor is established by the binding agent which in this case acts as light conductor.

The thickness of the layer of fluorescent substance or, when the fluorescent substance is embedded in a layer of binding agent, the thickness of the layer of binding agent and the concentration of the fluorescent substance in this layer, should be sufficiently great to ensure that as much of the short wave light as possible is absorbed but extinction of the emitted fluorescent light by the concentration of the fluorescent substance or by the substance itself is only just prevented.

In the production of the layer of fluorescent substance, clean operating conditions must be observed to ensure that fluorescence will not be extinguished by impurities. For the same reason, the finished layer of fluorescent substance must be protected against impurities and atmospheric influences. In the case of layers of fluorescent substance that have been applied by evaporation or other methods it is generally possible to obtain protection by evaporation of a thin transparent layer of silicon monoxide in a high vacuum; this layer subsequently oxidises in air to form silicon dioxide, in other words it is converted to quartz. However, this protection can be used only when the optical properties of this thin layer of quartz do not interfere. Otherwise, the layer of fluorescent substance may be protected by sticking a glass window on it.

According to the invention, photo-resistors and barrier layer cells with considerably increased sensitivity at the short wave end of the spectral sensitivity curved characteristic for the semiconductor material used can be produced without any significant alteration in the sensitivity in the remaining spectral region. One thus obtains an increase in the sensitive spectral region and the possibility of better adaptation of the spectral sensitivity to any given problem. It is a great advantage that the spectral sensitivity can also be extended to the short wave region by applying a suitable layer of fluorescent substance to photo resistors and barrier layer cells which are already finished although not yet assembled in a protective housing. The sensitivity in the short wave spectral region can be enhanced to a greater or less extent depending on the choice of fluorescent substance.

The improvement of the spectral sensitivity in the short-wave region is not restricted to cadmium sulphide-containing and cadmium selenide-containing photoconductive layers, but can also be applied to photoresistors of chalkogenides of lead or photoelements of selenium, silicon and gallium arsenide as well as on photodiodes and phototransistors of germanium and silicon.

The silicon photoelement, for example, has a high sensitivity in the near infra-red range with a broad maximum between about $\lambda=0.7$ and $\lambda=0.9\mu$. In the blue region, the sensitivity is about 5% up to at the most 10% of the sensitivity in the maximum region. To increase the sensitivity in the blue, green and yellow regions, a fluorescent substance may be used as wavelength transformer which absorbs this light and emits it in the region of maximum sensitivity, in other words in the red or near infra-red region. If the sensitivity in the red and infra-red regions are not to be markedly influenced, the fluorescent substance must not absorb in this region.

This suitable fluorescent substances for the process according to the invention are substances which absorb light mainly at the short wave end of the special sensitivity curve of the minerals used and emit it in the region of maximum spectral sensitivity of these materials.

Photoconductive structural elements with very good properties and very little variation of these properties are obtained by the process according to the invention. They are distinguished by their very high sensitivity and rapid response, i.e. their low lag. The use of these structural elements as photoresistors has the following advantages: Ohm's law is obeyed well; in the relationship $J_F \sim U^a$, where $J_F$ represents the photocurrent and U the voltage, the exponential is always $1.00 \leqq a \leqq 1.04$. The photocurrent $J_F$ varies in an approximately linear fashion with the intensity of illumination E, as in the relationship $J_F \sim E^b$ where $0.90 \leqq b \leqq 1.10$, where b is mainly between 1.0 and 1.1 in the case of illumination of low intensity and between 0.9 and 1.0 in the case of illumination of high intensity.

Figure 2:
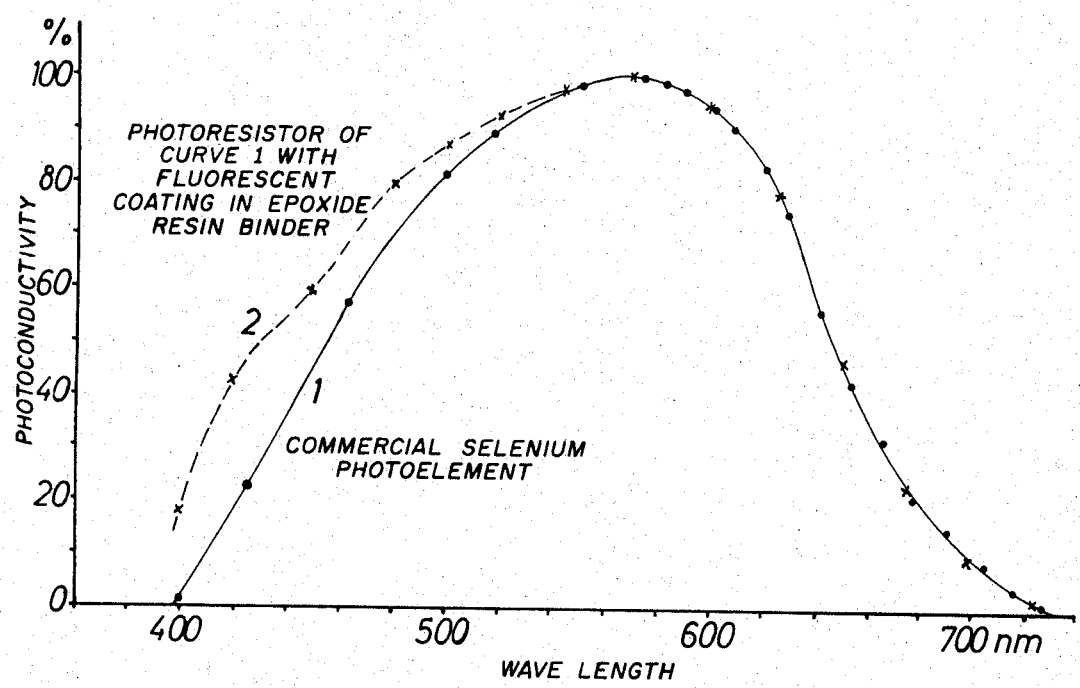

In the drawing, FIG. 1 shows a graph with curves of spectral sensitivity distribution of photoresistors made from doped cadmium sulfide with and without a fluorescent substance, while FIG. 2 shows a graph with curves of spectral sensitivity distribution of commercial selenium photoelements with and without a fluorescent substance.

*Example 1*

The starting material consists of very pure, degasified hexagonal cadmium sulphide in the form of fine crystalline powder and 2.5% very pure zinc sulphide, also in the form of a very fine powder. A solution of 1.5% $CdCl_2$ and 0.023% Cu in the form of $CuCl_2$ in twice-distilled water is added and the whole mixture is carefully homogenised. The thoroughly dried mixture is pressed into the form of circular disk-shaped tablets of 10 mm. diameter and 0.8 mm. thickness under a pressure of 7 tons per cm.² The tablets are then placed between two smooth flat plates of pure aluminum oxide in an oven heated from all sides to 500° C., and the tablets are heated there to 600° C. in 12 minutes. The temperature is maintained at 600° C. for 10 minutes. The whole heat treatment takes place in air. The oven has an accurately controlled air circulation. When the heat treatment is completed, the oven is switched off and the tablets are left to cool to 400° C. in the open oven. The tablets are then exposed to the vapour of silver + aluminum for depositing comb-electrodes in a high vacuum. The distance between two adjacent electrode strips is 0.4 mm.

If a direct voltage of 5 v. is applied to the system of comb-electrodes for aged photoresistors, then the photocurrent at 100 Lux and 2700° K. colour temperature is about 35 ma. The dark current is about 10 na. or less 30 seconds after the source of light has been switched off. Apart from very small voltages which are in any case of no practical importance in the use of photoresistors, the currents are independent of the polarity of the voltage applied. The process may also be carried out with the use of alternating voltage.

If no zinc sulphide is mixed with the cadmium sulphide but the method of manufacture is otherwise the same and the measurements are carried out under the same conditions, then the photocurrent is again about 35 ma. whereas the dark current is between 1 and 10 $\mu a$.

If 1% of synthetic calcium aluminum silicate with a pore diameter of 13 A. in the form of powder is homogeneously mixed with the mixture of cadmium sulphide and zinc sulphide, and the manufacture of the structural elements is otherwise the same, then the photoconductive properties of freshly prepared photoresistors are approximately the same as those of photoresistors produced without molecular sieves after ageing, assuming the conditions of measurement are the same.

The incorporation of molecular sieves at least partly anticipates the natural or artificial ageing and thus has a stabilising effect on the photoconductive properties.

*Example 2*

Cadmium sulphide photoresistors consisting of pressed and sintered circular disks of pure cadmium sulphide doped with 0.02% copper and chlorine compounds, having comb electrodes applied by evaporation, have the spectral sensitivity distribution shown in curve 1 of the FIGURE 1. As a result of doping, the maximum sensitivity, i.e. 100% photoconductivity lies at 605 nm. (wave length), whereas the base lattice absorption edge of the pure although relatively photo insensitive cadmium sulphide is at 515 nm. Sensitivity at 400 nm., in other words the transition region between violet and blue, for curve 1 is about 7% of the maximum sensitivity.

A homogeneous 0.2% mixture of 100% 3:9-perylene dicarboxylic acid diisobutyl ester as fluorescent substance in a colourless epoxide resin with an amine as cold setting agent is applied in a thickness of about 40μ to the surface of the resistors provided with comb electrodes. The layer of fluorescent substance is protected against atmospheric influences by a glass window attached by adhesion. The epoxide resin of the layer of fluorescent substance may be used as adhesive.

Under the same measuring conditions, the maximum of spectral sensitivity is shifted from 605 nm. to 590 nm. by this process (curve 2 of the FIGURE 1), whereas above about 605 nm. there is practically no change in the sensitivity. Below 590 nm. there is a considerable increase in sensitivity, which is more than 300% at 400 nm. and still almost 100% at 500 nm. Similarly good results are obtained with a homogeneous 0.1% mixture of 100% 9:10-dianiline-anthracene in the same epoxide resin, the process of production being otherwise the same. The maximum sensitivity is here at 560 nm.

*Example 3*

The starting material in form of fine crystalline powder consists of 98.0% of very pure cadmium selenide and 2.0% of very pure zinc sulphide. 1.5% of $CdCl_2$ and 0.020% of Cu in the form of $CuCl_2$, dissolved in twice-distilled water (calculated on 100% starting material) are added and the whole mixture is carefully homogenised. The thoroughly dried mixture is placed in a crucible with a perforated cover which does not fully close the crucible—both parts consist of pure aluminum oxide—and heated in the air for 18 minutes in an electrically heated oven which is constantly kept at 600° C. and then allowed to cool in the air. The tempered powder is thoroughly mixed in the dry state and pressed into circular disk-shaped tablets of 10 mm. diameter and 1 mm. thickness, under a pressure of 7 tons/cm.². The tablets are then placed between two smooth flat plates of pure aluminum oxide in an oven heated from all sides to 500° C. and the tablets are heated therein to 600° C. within 12 minutes. The temperature of 600° C. is maintained for 10 minutes. The whole tempering takes place in an oven having an accurately controlled air circulation. When the heat treatment is completed the oven is switched off and the tablets are left to cool to 400° C. in the opened oven. The tablets are then exposed to the vapour of silver and aluminum for depositing comb-electrodes in a high vacuum. The system consists of twice 4 strips, the distance of two adjacent strips and the breadth of the strips are 0.4 mm. each.

In the course of aged photoresistors the photocurrent up to 5 v. and 100 Lux incandescent light of 2700° K. is about 30 ma. The dark current is about 1 na. 30 seconds after switching off of a 1-hour-100 Lux incandescent illumination (2700° K.).

*Example 4*

An about 30/μ thick film of a colourless epoxide resin wherein a brightening substance, e.g. 1-p-sulphon-amido-phenyl-3-p-Cl-phenyl-pyrazoline, is dispersed uniformly in an amount of 0.01% per weight calculated on the epoxide resin, is applied to the light sensitive layer of commercial selenium photoelements. The spectral sensitivity, as shown in FIG. 2, in the maximum and the long-wave region is practically not altered; in the short-wave region however the sensitivity is substantially increased (see curve 22 as compared with curve 1), e.g. at 400 nm. by about 700%
420 nm. by about 150%
440 nm. by about 55%
460 nm. by about 20%
480 nm. by about 15%
500 nm. by about 5%.

We claim:
1. Photoconductive structural element which comprises photoconductive material composed of highly pure cadmium chalkogenide selected from the group consisting of cadmium sulfide, cadmium selenide, and cadmium sulfo-selenide, containing zinc sulfide, copper ions and chloride ions as guest components in the hexagonal lattice thereof with a transparent layer of a binding agent containing 0.01–1% by weight of a fluorescent substance in homogeneous distribution, said fluorescent substance absorbing the incident light at the short wave end of the spectral sensitivity curve of the photoconductive material and emitting such light as fluorescent light in the wave length region of maximum sensitivity of said material.

2. Photoconductive structural element according to claim 1 wherein such photoconductive material contains up to 3% by weight of a molecular sieve.

3. Photoconductive structural element according to claim 1 wherein such photoconductive material contains 0.5–10% by weight of zinc sulfide, 0.01–0.04% by weight of copper ions and 0.005–0.04% by weight of chloride ions.

4. Photoconductive structural element according to claim 3, wherein the fluorescent substance is a member selected from the group consisting of 3,9-perlyene dicarbonic acid diisobutylester, 1-p-sulfonamido-phenyl-3-p-chlorophenyl-pyrazoline and 9,10-dianilino anthracene.

5. Photoconductive structural element according to claim 3 wherein such photoconductive material contains up to 3% by weight of a molecular sieve.

6. Photoconductive structural element which comprises photoconductive material composed of highly pure cadmium chalkogenide selected from the group consisting of cadmium sulfide, cadmium selenide and cadmium sulfoselenide containing up to 3% by weight of a molecular sieve, and further containing zinc sulfide, copper ions and chloride ions as guest components in the hexagonal lattice thereof.

7. Process for the manufacture of photoconductive structural element which comprises mixing a highly pure cadmium chalkogenide selected from the group consisting of cadmium sulfide, cadmium selenide and cadmium sulfoselenide uniformly with 0.5–10% by weight of zinc sulfide, 0.5–2% by weight of cadmium chloride and 0.1–0.04% by weight of copper in the form of a copper salt as guest components, pressing the resulting photoconductive material mixture without the application of external heat to form a shaped article, heat treating said article under air circulation and coating such heat treated article with a transparent layer of a binding agent containing 0.01–1% by weight of a fluorescent substance in homogeneous distribution, whereby said fluorescent substance absorbs the incident light at the short wave end of the spectral sensitivity curve of the photoconductive material and emits it as fluorescent light in the wavelength region of maximum sensitivity of said material.

8. Process according to claim 7, wherein said binding agent is an epoxide resin.

9. Process according to claim 7, wherein said fluorescent substance is a member selected from the group consisting of 3,9-perylene dicarbonic acid diiobutylester, 1-p-sulfonamidophenyl-3-p-chlorophenyl-pyrazoline and 9,10-dianilino anthracene.

10. Process according to claim 7, wherein the cadmium chalkogenide is homogenized in aqueous phase with said guest components.

11. Process for the manufacture of photoconductive structural element which comprises mixing a highly pure cadmium chalkogenide selected from the group consisting of cadmium sulfide, cadmium selenide and cadmium sulfoselenide uniformly with 0.5–10% by weight of zinc sulfide, 0.5–2% by weight of cadmium chloride and 0.01–0.04% by weight of copper in the form of a copper salt as guest components, and with a molecular sieve in an amount of up to 3% by weight, pressing the mixture without the application of external heat to form a shaped article, and heat treating said article under air circulation.

12. Process according to claim 11 wherein the heat treated article is thereafter coated with a transparent layer of a binding agent containing 0.01–1% by weight of a fluorescent substance in homogeneous distribution, whereby said fluorescent substance absorbs the incident light at the short wave end of the spectral sensitivity curve of the photoconductive material and emits it as fluorescent light in the wavelength region of maximum sensitivity of said material.

13. Process according to claim 11, wherein the cadmium chalkogenide is homogenized in aqueous phase with said guest components and said molecular sieve.

References Cited

UNITED STATES PATENTS

| | | | |
|---|---|---|---|
| 2,908,594 | 10/1959 | Briggs | 117—201 |
| 2,997,408 | 8/1961 | L'Heureux | 117—33.5 |
| 2,999,240 | 9/1961 | Nicoll | 136—89 |
| 3,220,881 | 11/1965 | Yando | 117—33.5 |
| 3,284,235 | 11/1966 | Santen et al. | 117—33.5 |
| 3,284,252 | 11/1966 | Grimmeis et al. | 136—89 |
| 3,290,175 | 12/1966 | Cusano et al. | 136—89 |

OTHER REFERENCES

I.B.M. Tech. Disclosure Bulletin, "Variable Resistor Element," by Hildebrand et al., August 1961, vol. 4, No. 3.

EARL M. BERGERT, *Primary Examiner.*

HAROLD ANSHER, *Examiner.*

UNITED STATES PATENT OFFICE
CERTIFICATE OF CORRECTION

Patent No. 3,351,516                             November 7, 1967

Roland Weisbeck et al.

It is hereby certified that error appears in the above numbered patent requiring correction and that the said Letters Patent should read as corrected below.

Column 1, line 27, before "high" insert an opening parentheiss; line 35, for "power" read -- powder --; column 5, line 72, for "minerals" read -- materials --.

Signed and sealed this 19th day of November 1968.

(SEAL)

Attest:

Edward M. Fletcher, Jr.

Attesting Officer

EDWARD J. BRENNER

Commissioner of Patents